Sept. 14, 1948.   G. L. SANSBURY   2,449,178
STEP-BY-STEP AUTOMATIC TUNING CONTROL
Filed March 6, 1947   4 Sheets-Sheet 1
FIG. 1.
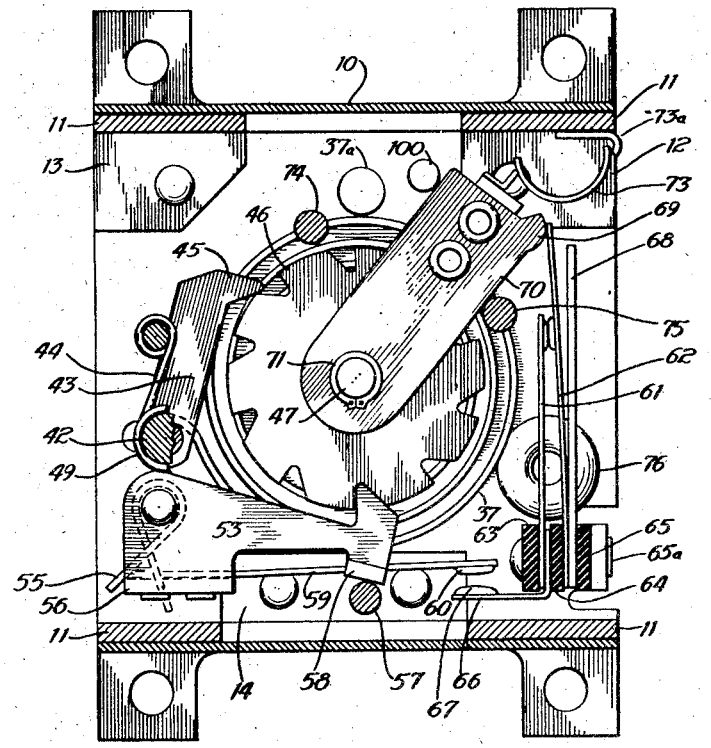
FIG. 6.
FIG. 7.
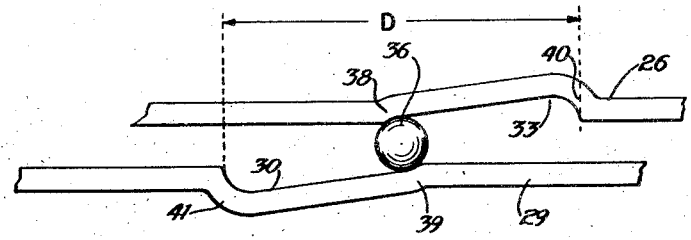
INVENTOR
GEORGE L. SANSBURY
BY John J. Logan
ATTORNEY Sept. 14, 1948.  G. L. SANSBURY  2,449,178
STEP-BY-STEP AUTOMATIC TUNING CONTROL
Filed March 6, 1947  4 Sheets-Sheet 2

INVENTOR
GEORGE L. SANSBURY
BY
ATTORNEY

Sept. 14, 1948.   G. L. SANSBURY   2,449,178
STEP-BY-STEP AUTOMATIC TUNING CONTROL
Filed March 6, 1947   4 Sheets-Sheet 3

INVENTOR
GEORGE L. SANSBURY
BY
ATTORNEY

Sept. 14, 1948.  G. L. SANSBURY  2,449,178
STEP-BY-STEP AUTOMATIC TUNING CONTROL
Filed March 6, 1947  4 Sheets-Sheet 4

INVENTOR
GEORGE L. SANSBURY
BY John J. Logan
ATTORNEY

Patented Sept. 14, 1948

2,449,178

UNITED STATES PATENT OFFICE 2,449,178

STEP-BY-STEP AUTOMATIC TUNING CONTROL

George L. Sansbury, Cedar Rapids, Iowa, assignor to Collins Radio Company, Cedar Rapids, Iowa, a corporation of Iowa Application March 6, 1947, Serial No. 732,696

13 Claims. (Cl. 318—21)

This invention relates to remote control apparatus and more especially to arrangements for selectively rotating a control shaft to any one of a number of desired positions.

A principal object of the invention is to provide a simplified and rugged device for electromagnetically rotating a control shaft to any one of a number of desired positions.

Another object is to provide a novel combination of electric circuits and electromagnetic and mechanical controls whereby a device such as a radio tuning or control unit, can be remotely set at any desired position and with a high order of accuracy.

An additional object is to provide a simplified and improved electromagnetic step-by-step motor unit for translating received selective impulses into angular positions of a shaft to be controlled.

A feature of the invention relates to an improved electromagnetically controlled ratchet device for operating a control shaft in a step-by-step manner whereby the shaft is positively driven during its entire rotational movement between successive positions.

A further feature relates to an improved device for translating electric impulses into mechanical rotations of a shaft, through the intermediary of a solenoid plunger which undergoes a composite reciprocating and rotary motion.

A still further feature relates to an improved step-by-step motor arrangement for electric control devices which unit comprises an electromagnetic solenoid with a novel mechanical arrangement for converting the reciprocating movement of the solenoid plunger into step-by-step rotary movements of a shaft.

A still further feature relates to the novel organization, arrangement and relative interconnection of parts which cooperate to provide an improved automatic shaft control system.

Other features and advantages not specifically enumerated will be apparent after a consideration of the following detailed descriptions and the appended claims.

In the drawing,

Fig. 1 is a front view of the device, with the front cover plate removed, to show the interior construction more clearly.

Figs. 6 and 7 are respective fragmentary views of part of the solenoid motor device to explain its operation.

Figure 2:
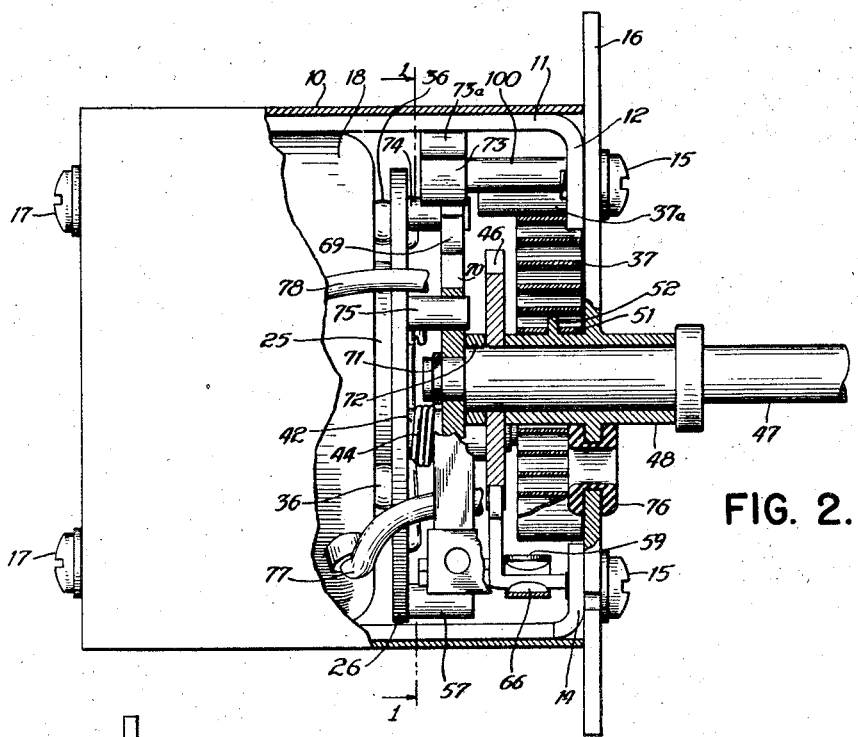
Fig. 2 is a left-hand side view of Fig. 1 with the enclosing housing broken away.
Figure 3:
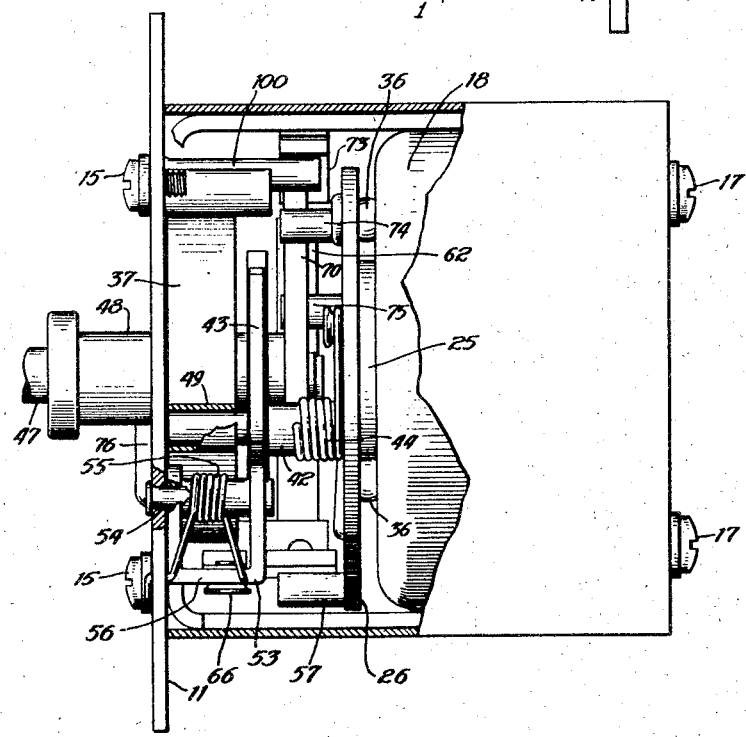
Fig. 3 is a right-hand side view of Fig. 1.
Figure 4:
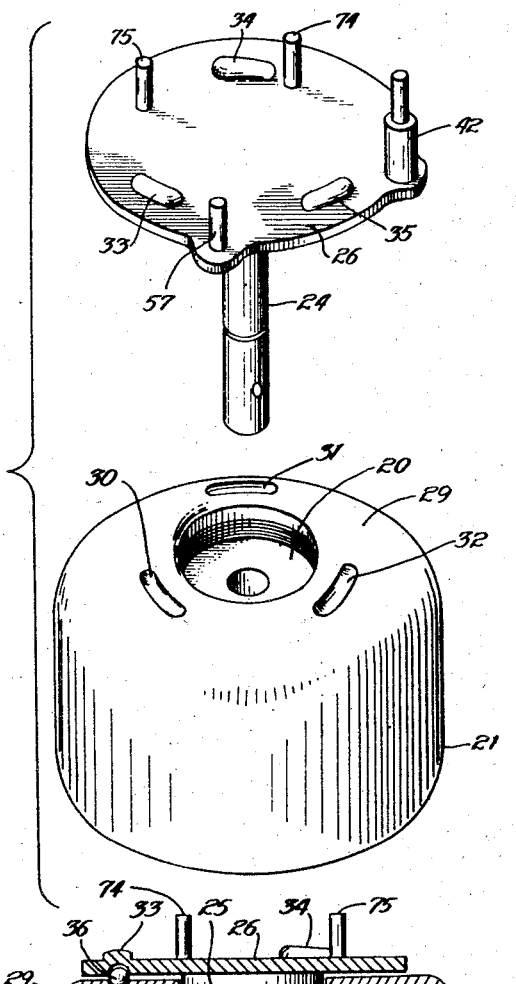
Fig. 4 is an exploded view of the solenoid motor device incorporated in the unit of Figs. 1 to 3.
Figure 5:
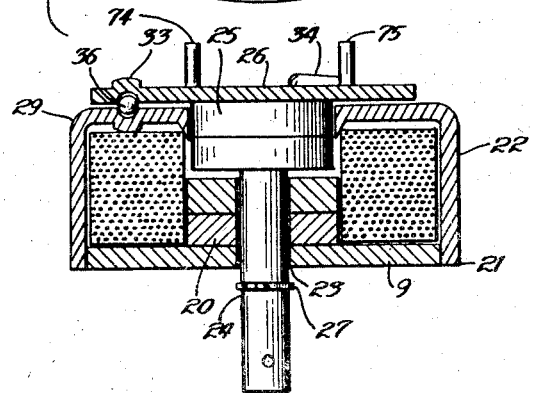
Fig. 5 is a sectional view of the solenoid motor device.

The device is enclosed within a metal box-like housing 10. Fitted within the housing is a rigid metal frame work 11, of substantially C-shaped form and having at its forward ends downwardly depending lips 12, 13, and an upwardly extending lip 14. Attached to these lips by screws 15 is a front plate 16 which carries certain of the parts to be described. Suitably fastened to the rear wall of frame 11, for example by screws 17, is a solenoid motor unit 18, which is shown in detail in Figs. 4 and 5. This unit comprises a flat iron disc 9 to which is welded or otherwise fastened a central annular soft iron pole piece 20. Disc 9 is tightly fitted within the rim 21 of an iron casing thus providing an annular space within which is located a solenoid coil or winding 22. Disc 9 at its central opening is fitted with a bearing washer or sleeve 23 for the plunger shaft 24, which carries at its upper end a circular soft iron magnetic core member 25 fastened to an iron disc 26. The shaft 24 has a circular recess adjacent its lower end to receive a collar or washer 27 to limit the upward movement of the shaft 24. Thus, shaft 24 and disc 26 are capable of limited unitary movement in an axial direction and are capable of rotation around this axis. The magnetic core 25 is slightly smaller in diameter than the circular opening 28 in the casing 21. Consequently, when the winding 22 is energized, it pulls the core 25 and its attached disc 26 downwardly as shown in Figs. 2 and 5. In order to convert the reciprocating motion of shaft 24 into a rotary motion, the wall 29 of casing 21 has three inclined recesses 30, 31, 32, and the adjacent face of disc 26 has a similar set of inclined recesses 33, 34, 35. These recesses are arcuate and are equi-distant from the center of the disc and are spaced apart on centers approximately 120 degrees, each recess being approximately 22½ degrees in arcuate length. A set of three metal balls 36 are provided, each ball riding in the corresponding aligned recesses 30—33, 31—34, 32—35. By means of a coil spring 37 described hereinbelow, the disc 26 is rotated to a normal or rest position (Fig. 6), wherein the relation of the cooperating recesses 30—33, etc., and the respective ball bearings is shown in Fig. 6, from which it will be seen that disc 26 is spaced from the casing wall 29 by a certain distance, and the rotation of the disc 26 with respect to the casing is limited by the engagement of the ball 36 with the opposed shoulders 38, 39, of its respective recesses as shown in Fig. 7. Consequently, when the disc 26 is pulled downwardly as a result of the energization of winding 22, the disc rotates through an angular distance D which is approximately equal to twice the length of each recess. The angular rotation of disc 26 is limited by the ball 36 engaging the opposed shoulders 40, 41, in the respective recesses (Fig. 7). Thus, for each energization of the solenoid winding, the disc 26 is rotated through an angle of approximately 45 degrees and when the solenoid is deenergized the disc 26 is returned to its normal or rest position by spring 37.

Disc 26 has attached thereto an arm 42 carrying a driving pawl 43 which is urged by a spring 44, so that the pawl tooth 45 normally engages the toothed ratchet wheel 46. Wheel 46 is rigidly fastened to a shaft 47 which is integrally carried by plate 16. Consequently, as disc 26 rotates, it causes pawl 43 to drive the ratchet wheel 46 in a clockwise direction (Fig. 1) the rotation being against the force of spring 37 which has one end 49 looped around the arm 42, which carries pawl 43 and the outer turn engages a fixed stop 37a. The opposite end 51 of spring 37 fits over a fixed pin 52 on sleeve 48. For the purpose of locking wheel 46 in its selected position, a stop pawl 53 is pivoted on stub shaft 54 having one end anchored to plate 16. Ordinarily, in devices of this type, reliance would be placed upon the spring 55 to maintain the pawl 53 in stopping engagement with the ratchet wheel, and while for certain purposes this may be found satisfactory, I have found that in systems to be described in connection with Fig. 6 where extreme accuracy of stopping is required, additional positive means must be provided for locking the wheel 46 in its selected position. For this purpose, disc 26 carries a pin 57 which engages a lip 58 on pawl 53, so as positively to force the locking tooth of pawl 53 in engagement with the selected recess in the wheel 46. On the other hand, when the wheel 46 is about to begin its selective rotation under control of the power driving pawl 43, the pin 57 disengages the lip 58 and pawl 53 is held in contact with the teeth of wheel 46 merely by the spring 55.

Supported from pawl 53 is a leaf spring 59, which carries a contact 60. Likewise, insulatingly mounted on the front wall 16 are a pair of leaf springs 61, 62, which are clamped at one end between intervening insulator spacers 63, 64, 65, by means of a screw 65a which passes through the insulating spacers and through suitable insulating washers (not shown) so as to prevent short-circuiting of the springs 61, 62. Also clamped between the spacers 63, 64, and in contact with spring 61, is a rigid plate 68 which acts as a back stop for spring 62 and limits clockwise rotation of arm 70. Counterclockwise rotation of arm 70 is limited by pin 100, which is mounted on plate 16. Each of the springs 61, 62, carries at its upper end respective cooperating contacts. Normally, that is in the position of rest of disc 26 (Fig. 1), the contacts on springs 61, 62, are in engagement. In this position, there is a slight clearance between upper end of spring 62 and the rounded corner 69 of an insulating arm 70, which arm is supported on the end of shaft 47 for free rotation with respect thereto and is held in place thereon by a split ring 71 which seats in a groove at the reduced end of shaft 47.

Attached to member 11 is a lipped member 73a which receives the end of a bowed leaf spring 73, the other end of which is pivotally attached to the end of arm 70, so as to constitute with that arm, in effect, a toggle which is capable of instantly snapping arm 70 in one direction or the other depending upon which way the toggle is broken. In order to break the toggle, disc 26 carries two pins 74, 75. After disc 26 has begun its rotation in the clockwise or power driven direction by means of pawl 43, pin 74 engages arm 70 and causes the toggle to break and snap in a clockwise direction whereby the contact springs 61, 62, are separated. On the other hand, when the disc 26 reaches the end of its counterclockwise or return-to-normal direction, pin 75 engages arm 70 and breaks the toggle counterclockwise causing the reengagement of the contact springs 61, 62.

Plate 16 is provided with an opening into which is fitted a rubber grommet 76 through which pass the lead-in wires 77, 78, for the solenoid winding 22, and the various circuit wires which are connected to suitable connector tabs (not shown) on the anchored ends of the respective leaf springs 59, 61, 62 and 66.

Figure 8:
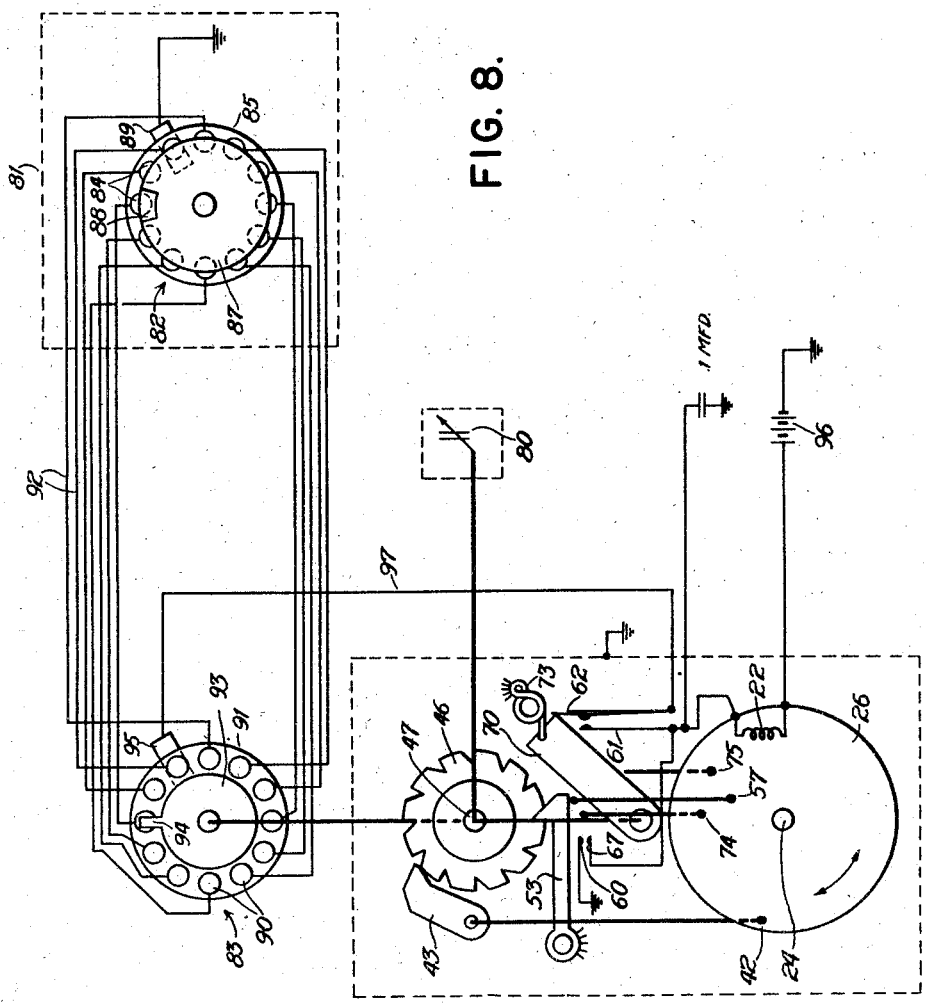
Fig. 8 is a composite electrical and mechanical diagram showing an automatic shaft positioning system embodying the device of Figs. 1 to 7.

The operation of the device of Figs. 1 to 7 will be clear from the ensuing description taken in conjunction with the schematic diagram of Fig. 8, wherein the parts which are the same as those of Figs. 1 to 7 are designated by the same numerals. In Fig. 8, mechanical connections or engagements between certain of the parts are indicated schematically by heavy or thick lines, whereas the electrical wiring connections are represented by fine lines. As pointed out above, the device is primarily intended to control the rotational selective setting of any device such for example as a radio tuning element 80 which is arranged to be mechanically coupled to shaft 47 and which is designed to be remotely controlled from a master station 81 at which is located a manually operable multipoint selector switch 82.

Merely for explanatory purposes, it will be assumed that the device 80 is to be selectively positioned in any one of twelve different angular settings, and for this purpose switch 82 has twelve stationary contacts 84 which are suitably supported in an insulating disc or block 85. Mounted for rotation parallel to the plane of the fixed contacts is a metal disc 87 having a peripheral slot or cutout 88, the width of which is slightly greater than the diameter of the stationary contacts 84, so that when the disc 85 is centered with respect to a bank contact, the edges of the slot 88 entirely clear the said contact. A grounded and fixed brush 89 makes continuous contact with the disc 85. Switch 82 is shown as having been previously turned so that the #1 contact 84 is the only one of the twelve which is ungrounded.

The line finder or selector switch 83 at the remote point also has a series of twelve stationary contacts 90 which may be supported in an insulation disc 91. These stationary contacts are connected by individual wires 92 to the corresponding numbered contacts of switch 82. Cooperating with the contacts 90 is a metal disc 93 whose diameter is such that it clears the contacts 90, but it carries a brush or wiper 94 which successively engages the contacts 90 as the disc 93 is rotated. The fixed brush 95 is in continuous wiping engagement with the disc 93. The toothed wheel 46 previously described herein, also has a series of twelve teeth, and twelve corresponding notches to be engaged by the pawl 43. Therefore the final selective positioning of the device 80 is under the conjoint control of the automatic selector switch 83 and the toothed wheel 46.

It will be assumed that the device 80 is to be automatically moved to a new setting, for example that corresponding to #3 contact of switch 82. For this purpose switch 82 is manually operated to cause slot 88 to register with #3 contact, which removes the ground from the corresponding #3 contact at switch 83. However, ground is applied to all the remaining contacts of switch 83 including the previously selected #1 contact, whereupon a circuit is traceable from the grounded battery 96, through solenoid winding 22, contacts 61, 62, conductor 97, brush 95, disc 93, brush 94, contact #1 of switch 83, to ground at the corresponding #1 contact of switch 82. The energization of solenoid 22 causes the disc 26 to be rotated in a clockwise direction, thus causing pawl 43 to start rotation of the wheel 46. As soon as the disc 26 starts rotating clockwise, the member 57 disengages the locking pawl 53 and enables the wheel 46 to be positively driven by pawl 43 in a clockwise direction. However, at the same time, pawl 53 is released by member 57, and it is cammed downwardly by the inclined face on the wheel teeth causing the contacts 60 and 67 to be closed, thus providing a parallel energizing circuit for the solenoid winding 22. A short time later the member 57 engages arm 70 and breaks the toggle in a clockwise direction, thus opening contacts 61 and 62. Rotation of the solenoid disc 26 therefore continues and positively drives the wheel 46 until pawl 53 again drops into the next wheel slot and allows contacts 60, 67, to open, thus removing energizing current from the winding 22. The spring 37 thereupon returns the solenoid disc 26 to its normal or "at rest" position and at the end of this return stroke the arm 70 is engaged by the member 75, causing the toggle switch to be broken in a counterclockwise direction and resulting in the reclosure of contacts 61, 62. During this return movement of disc 26, the wheel 46 is locked against counter-clockwise rotation by means of pawl 53. The above-described sequence of operations continues until the brush 94 finds the #3 contact which is now ungrounded, whereupon the switch 83 comes to rest as does the toothed wheel 46. At the same time that the cycle of operations is completed, the member 57 reengages the pawl 53 and mechanically forces it into positive locking engagement with the toothed wheel 46. The device 80 is thereupon positively locked in its selected angular position. From the foregoing, it will be seen that the wheel 46 is positively driven from one position to each successive position, and that it is positively locked between each successive step as distinguished from the conventional pawl operated ratchet wheel, wherein the operating pawl is given an impulse and reliance is placed upon the inertia of the ratchet wheel to carry it from one position to the next position, and wherein reliance is placed merely upon a spring-pressed stop member to hold the ratchet wheel in its successive rest positions.

What is claimed is:

1. An automatic shaft-positioning arrangement comprising an automatic selector switch of the line finder type, a step-by-step motor device for operating said switch and the shaft to be controlled, said motor device comprising a toothed wheel, a cooperating driving pawl, and a solenoid having its plunger connected to said pawl and provided with means to convert received selected impulses into a composite rectilinear and rotary movement of said plunger, the last-mentioned means comprising a disc attached to said plunger and having a plurality of camming guides and a cooperating ball for each guide for converting the reciprocal motion of said plunger into said composite movement, said driving pawl being attached to said disc.

2. An automatic shaft-positioning arrangement comprising an automatic selector switch, a step-by-step motor device for operating said switch and the shaft to be controlled, an impulsing circuit for said motor device completed through the contacts of said selector switch, said motor device comprising a toothed driving wheel and cooperating driving pawl, a solenoid having its plunger connected to said driving pawl, and means to convert received selective impulses into composite rectilinear and rotary movement of said plunger to drive said toothed wheel positively throughout its entire arcuate movement between each successive selective position of said switch, the last-mentioned means comprising a disc attached to said plunger and having a plurality of camming guides and a cooperating ball for each guide for converting the reciprocal motion of said plunger into said composite movement, said driving pawl being attached to said disc.

3. An automatic shaft-positioning arrangement comprising an automatic selector switch of the line finder type, a step-by-step motor device for operating said switch and the shaft to be controlled, an impulsing circuit for said motor device controlled through the contacts of said selector switch, said motor device including a toothed driving wheel and associated driving pawl, a solenoid having its plunger connected to said pawl, a spring normally tending to turn said plunger around its axis to a rest position, and means responsive to each impulse to rotate said plunger through a predetermined angle sufficient to drive said wheel positively throughout its entire arcuate length between each successive tooth, said spring being effective upon each deenergization of said solenoid to return said plunger to its rest position without disturbing the previously set position of said wheel.

4. An automatic shaft-positioning arrangement comprising an automatic selector switch having a series of fixed contacts each allotted to a particular setting of said shaft, said switch having a brush for engaging said contacts, a step-by-step motor device for operating said switch, an impulsing circuit for said motor device completed through the contacts of said switch, said motor device comprising a toothed wheel having a tooth for each of said fixed contacts, a driving pawl for said wheel, a rotatable member on which said pawl is carried, a solenoid plunger attached to said member, a solenoid winding for said plunger and connected in said impulsing circuit, and means to convert the reciprocating motion of said plunger into rotary motion of said member to cause said pawl to drive said wheel positively throughout its entire arcuate travel between each successive selective position of said switch.

5. An automatic shaft-positioning arrangement comprising an automatic selector switch of the rotary line finder type, a step-by-step motor device for operating said switch, an impulsing circuit for said motor device controlled by the contacts of said selector switch, said motor device comprising a toothed wheel and cooperating driving pawl, a rotatable member carrying said pawl, a solenoid having a plunger fastened to said member, at least one inclined guide on one face of said member, a ball bearing in said guide, a fixed support on which said ball is arranged to roll while in said guide, and means including said impulsing circuit to energize said solenoid for causing said guide and ball to act as a camming device to translate the reciprocating motion of said plunger directly into a rotary motion of said member.

6. An automatic shaft-positioning arrangement comprising an automatic selector switch of the rotary type, a step-by-step motor device for operating said switch, an impulsing circuit for said motor device controlled through the contacts of said switch, said motor device comprising a toothed wheel and cooperating driving pawl, a rotatable member carrying said pawl, a solenoid having a plunger which is attached to said member, a plurality of pairs of cooperating inclined guides in said member and said support, a ball bearing in each pair of guides, and means including said impulsing circuit to energize said solenoid for causing said guides and balls to coact as camming devices to translate the reciprocating motion of said plunger directly into a rotary motion of said member.

7. An automatic shaft-positioning arrangement according to claim 6 in which each cooperating pair of said inclined guides have opposite inclinations with respect to the rotational axis of said member.

8. An automatic shaft-positioning arrangement according to claim 6 in which a spring is provided for restoring said member to a normal position after each deenergization of said solenoid without disturbing the previous set position of said wheel.

9. An automatic shaft-positioning arrangement according to claim 5 in which a separate stop pawl is provided for said wheel, and said rotatable member carries a projection which mechanically engages said stop pawl to lock said wheel positively when it reaches its normal position.

10. An automatic shaft-positioning arrangement according to claim 5, in which a separate stop pawl is provided for said wheel and having a spring for maintaining it in contact with the teeth of said wheel, and said rotatable member carries a projection which mechanically engages said stop pawl to lock it mechanically against said wheel when the latter is in a rest position.

11. An automatic shaft-positioning arrangement comprising an automatic selector switch, a step-by-step motor device for operating said switch and the shaft to be controlled, said motor device comprising a toothed wheel, a cooperating driving pawl and a cooperating stopping pawl, a solenoid for operating said driving pawl, said solenoid having a plunger arranged for reciprocation and rotation, a disc attached to said plunger, a plurality of camming guides and cooperating balls for turning said disc through a predetermined angle in response to energization of said solenoid, said pawl being attached to said disc, a pair of contacts associated with said wheel and normally closed when said wheel is in its rest position, an impulsing circuit for said solenoid initially completed through said pair of contacts and through the contacts of said selector switch, and a substitute switching circuit comprising a pair of contacts which are normally open when said wheel is at rest and which are closed while the wheel is moving between successive positions.

12. An automatic shaft-positioning arrangement comprising a selector switch, a step-by-step motor for operating said switch, said motor comprising a solenoid having a plunger and means to convert the reciprocating motion of said plunger into a rotary motion thereof, a driving pawl connected to said plunger, a toothed wheel connected to said switch and to the shaft to be controlled and operated by said driving pawl, a stop pawl for said toothed wheel, an impulsing circuit for the solenoid comprising the contacts of said selector switch and a pair of normally closed contacts associated with said wheel, another pair of normally open contacts for said wheel also providing a substitute switching circuit for said solenoid independent of said selector switch, a snap-acting member for opening said pair of normally closed contacts in response to the initial movement of said wheel, said snap-acting member being operated mechanically by the rotary motion of said plunger when said plunger is rotating away from its rest position, and means carried by said plunger for operating said snap-acting switch member in the opposite direction to close said pair of normally closed contacts when said plunger reaches its rest position.

13. An automatic shaft-positioning arrangement comprising a selector switch of the line finder type, a step-by-step motor for driving said switch, said motor comprising a solenoid plunger, a member attached to said plunger and having means to convert the reciprocating motion of the plunger into a rotary motion of said member, a toothed wheel fastened to the shaft of said selector switch, a driving pawl for said toothed wheel and carried by said member, a snap-acting switch, means carried by said member for operating said snap-acting switch to close said contacts when said member is at its position of rest, a projection carried by said member for operating said snap-acting switch to open said contacts when said member begins its rotary motion, a stopping pawl for said toothed wheel, and a pair of contacts closed by said stopping pawl for substantially the entire interval while said toothed wheel is moving between successive rotary positions, and further means carried by said member for mechanically locking said stopping pawl against said toothed wheel when said member is in its rest position.

GEORGE L. SANSBURY.

REFERENCES CITED

The following references are of record in the file of this patent:

UNITED STATES PATENTS

| Number | Name | Date |
|---|---|---|
| 2,362,690 | Fichter et al. | Nov. 14, 1944 |